United States Patent [19]

Monaghan

[11] 3,987,671

[45] Oct. 26, 1976

[54] METER FOR MEASURING MACHINE OUTPUT IN RELATION TO FUEL CONSUMPTION

[76] Inventor: Hugh M. Monaghan, 32 N. Howell's Point Road, Bellport, N.Y. 11713

[22] Filed: July 14, 1975

[21] Appl. No.: 595,923

Related U.S. Application Data

[63] Continuation-in-part of Ser. No. 508,305, Sept. 23, 1974, abandoned.

[52] U.S. Cl. ............................................. 73/114
[51] Int. Cl.² ........................................ G01F 9/00
[58] Field of Search .......... 73/114; 235/61 J, 150.21

[56] References Cited
UNITED STATES PATENTS

| | | | |
|---|---|---|---|
| 2,176,502 | 10/1939 | Kurth | 73/114 |
| 2,295,586 | 9/1942 | Little | 73/114 |
| 2,916,914 | 12/1959 | Graves et al. | 73/114 |

FOREIGN PATENTS OR APPLICATIONS

| | | | |
|---|---|---|---|
| 1,121,129 | 7/1968 | United Kingdom | 73/114 |

*Primary Examiner*—Jerry W. Myracle
*Attorney, Agent, or Firm*—Burgess, Dinklage & Sprung

[57] ABSTRACT

A meter for a machine employing a fluid fuel, and receiving fuel in proportion to machine demand, for indicating output of the machine in relation to fuel consumption, e.g. miles per gallon. A gas can be injected into the fuel line, in dependence on machine output, e.g. miles traversed, for formation of gas bubbles therein and slug flow of fuel through a length of the fuel line. Bubble sensing and signal output means are provided for sensing bubbles in the length of the line, and producing an output signal which is a measure of the machine output in relation to fuel consumption. An indicator is operatively connected to the bubble sensing and signal output means and indicates the machine output in relation to fuel consumption. Instead of gas bubbles, another signal, which is a measure of machine output can be employed.

11 Claims, 15 Drawing Figures

METER FOR MEASURING MACHINE OUTPUT IN RELATION TO FUEL CONSUMPTION

This application is a continuation-in-part of Ser. No. 508,305, filed Sept. 23, 1974 now abandoned.

BACKGROUND OF THE INVENTION

The present invention relates to the measurement of fluid flow volumes and also to methods particularly suited to the monitoring of automotive fuel consumption and more specifically to a miles per gallon meter.

Measurement of fuel consumption has always been a direct way of determining the efficiency of an automobile. Calibrated fuel reservoirs are used for test and tune up purposes and it is becoming more common for the average driver to record his mileage and perform the simple calculation of miles per gallon each time he fills his tank. These averaging methods are useful but do not indicate fuel consumption during normal driving.

Today with rising fuel costs and energy conservation becoming matters of widespread concern, instantaneous fuel consumption monitoring is becoming a most desirable way of saving gasoline by improving driving habits, selecting the best fuel and maintaining the overall efficiency of the vehicle.

The present invention offers a novel simple method for monitoring the miles per gallon fuel consumption of an automobile by injection of air or other gas bubbles into the fuel line, proportional to transversed mileage, generating signals from the air bubbles and processing the signals to provide a read-out in miles per gallon.

This inventor's first experience with air bubble injection came while working with analytical chemistry techniques by which air bubbles are injected into small flow streams for the purpose of separation of solutions to prevent mixing and contamination.

Earlier work has been done on gas flow rate measurement, by photo-optical detection of bubbles of the gas rising in a static fluid. Shields, U.S. Pat. No. 2,967,450, entitled "Optical Bubble Flowmeter," employs a photocell for detection coupled with an amplified and an electronic rate counter (col. 1, lines 29–38).

Air or an immiscible fluid (e.g. mercury) has been injected into a flowing stream for measuring of fluid flow rates. In these devices a signal from the injected substance is electronically detected, and processed with the aid of a timing circuit or counter to provide a conversion to flow rate. Mileage is not introduced.

Ford, U.S. Pat. No. 3,308,660, "High Pressure Flowmeter," describes a flowmeter for measuring flow rate (col. 1, lines 15–17) wherein a drop of immiscible fluid (e.g. mercury) (col. 1, line 26 and col. 1, line 45) is injected at spaced time intervals (col. 1, line 37); two electrode detectors are used (col. 1, lines 41–44) to activate a counter (col. 1, lines 51–52).

Versaci., U.S. Pat. No. 3,403,555, measures the rate of flow of an injected air bubble past two photoelectric detectors (col. 2, lines 27–32). The bubble is injected by the operator when a reading is desired (col. 3, lines 52–55) and a complex timing unit is employed (FIG. 4 and col. 2, lines 27–32).

Gildner, U.S. Pat. No. 3,693,436, "Liquid Flow Meter," utilizes an air bubble of predetermined size injected by means of an air supply tank and valve (col. 4, lines 20–23) as an improved means of measuring liquid flow rate (col. 1, lines 4–16). Two photo-optical detectors (col. 1, lines 34–39; col. 3, lines 10–16) and a timing means, (col. 1, lines 39–41) are used.

Air injection has also been used as a means for separation of a flowing stream into equal volume segments.

Soderkvist, U.S. Pat. No. 3,621,715, "System for Measuring the Flow Volume of a Liquid Flow," discloses a device to introduce exact liquid volumes into test tubes (col. 1, lines 54–58). It uses gas bubbles generated by a gas pump controlled by a logic circuit (col. 1, line 18; col. 6, lines 42–43). A means is also provided for a signal from a detector to control the gas pump injection volume (col. 3, lines 21–23). This system employs its own constant duration air injection control signal. This is a volume separation device and no mileage relationship is involved.

The above-mentioned prior art does not disclose a device for indicating miles per gallon.

A very early proposal for a miles per gallon meter was made by Little in U.S. Pat. No. 2,295,586. Insofar as understood, within a transparent tube coupled into the fuel line, air bubbles produced at arbitrarily timed intervals by a pump, are introduced into the flowing fuel and are visually compared with the linear speed of the surface of an internal helix driven by the speedometer shaft. In at least one embodiment, the helix is adjustable in pitch and is provided with a calibration in miles per gallon such that a visual reading can be taken when the linear velocities of the bubbles and the helix are made equal (col. 1, line 17 to col. 2, line 10). This is the only miles per gallon meter found which proposes the use of air bubbles. The device greatly differs from the present invention. It is a manually operated visual device; the air bubble injector is not governed by the vehicle mileage; and the mileage input is achieved by an independently driven helical member.

Another miles per gallon meter was proposed by Veach, U.S. Pat. No. 3,246,508. Flow rate, e.g. gallons per hour, are determined with the aid of, e.g. an orifice flow meter, and is utilized to control the position of a line pointer on a dial calibrated so that numerous miles per gallon rates are indicated for each position of the line pointer. The dial also has indicia for miles per hour so that the correct value for gallons per mile can be selected by a visual correlation. (col. 1, lines 43–51; col. 1, lines 36–39; col. 6, lines 45–53).

In the search for miles per gallons meters, the three proposals discussed below were found to represent the most recent developments in the art. All three are based on the same fundamental principle. In each, vehicle speed and fuel flow rate are separately evaluated and then these two measurements are combined, electronically processed, and miles per gallon is displayed.

In operation the speed is converted to voltage by a generator coupled with the speedometer cable drive; the flow rate is converted to electrical resistance by a flow transducer; and the read-out is by means of ammeter. The analog equations are, $$\frac{V}{r} = i \propto \frac{MI.}{HR.} / \frac{GAL.}{HR.} = \frac{MI.}{GAL.}$$

The primary problem in these devices is the complexity and reliability of the flow transducer.

In Sorenson, U.S. Pat. No. 3,253,459, the flow rate transducer is a flow activated float device coupled to variable resistor mechanism which may be any of a variety of types as shown in FIGS. 6 to 10 and FIGS. 18 to 22. The transducer is coupled with a voltage generator and ammeter (col. 6, lines 2–4).

Spacek, U.S. Pat. No. 3,673,863 describes a device which is presently being marketed by "Space Kom Inc., " Golela, Cal. 93017. In this device the flow transducer is a photo-optical unit whereby a free standing opaque body is caused by the fuel flow to effect an output signal change of a light sensitive detector (col. 2, line 70 to col. 3, line 2). This resistance value is coupled with the output voltage of a speed transducer, (col. 2, lines 21–31) to control the ammeter read-out, (col. 3, lines 2–4). It is to be noted that the change in resistance is not linear to the change in flow so that a complex linearizing mask must be used in the optical path (col. 5, lines 7–24).

Finally, Taylor, U.S. Pat. No. 3,776,036 discloses a device in which the flow transducer is similar to that of Spacek. The mileage transducer is mentioned but not defined. This device is presently being marketed by Aviatric Ltd., Hampshire, England. The photo-optical flow transducer employs a spring loaded instream opaque float such that the device is not position sensitive (col. 2, lines 7–13). In Spacek the float displacement axis must be kept vertical. An additional feature is the use of a mirror and second photocell to achieve light output balance which may be required due to a change in opacity of the fuel (col 2, line 64, to col. 3, line 6). This is a conventional biasing technique.

THE INVENTION

An object of the invention is to provide a more simple and more reliable means of determining automotive fuel consumption by combining the mileage and fuel information before detection and signal processing.

A further object of the invention is to eliminate the need of a complex and delicate analog flow transducer in a fuel consumption measurement system.

A feature of the invention is that measurement can be made by a novel and simple method of volumetric proportioning utilizing only one signal detector with a simple electronic system. A complex counter or timing circuit is not required.

A further feature of the invention is that flow rate measurement techniques may be employed utilizing the digital nature of the signal produced by the air slugs to overcome the deficiencies of the analog flow transducer.

The manner in which the indicated objectives and features of the invention are realized will be apparent from the ensuing description.

BRIEF DESCRIPTION OF THE DRAWINGS

In the following detailed description of the embodiments of the invention, reference is made to the accompanying drawings, in which.

In the drawings, like reference characters refer to corresponding parts.

Figure 1:
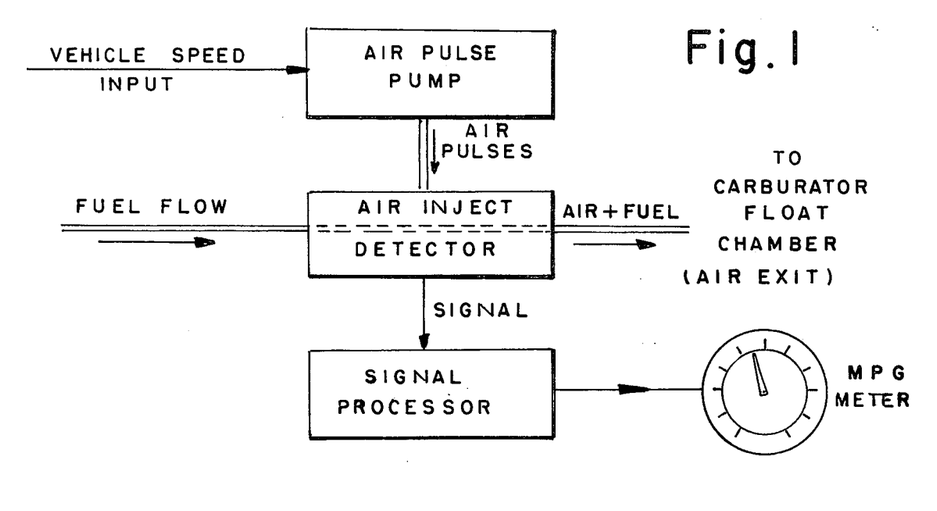
FIG. 1 is a block diagram of the system of the invention.

The block diagram of the system shown in FIG. 1, is self-explanatory when considered in the light of the ensuing disclosure.

Figures 2, 3A, 3B, 4, 5:
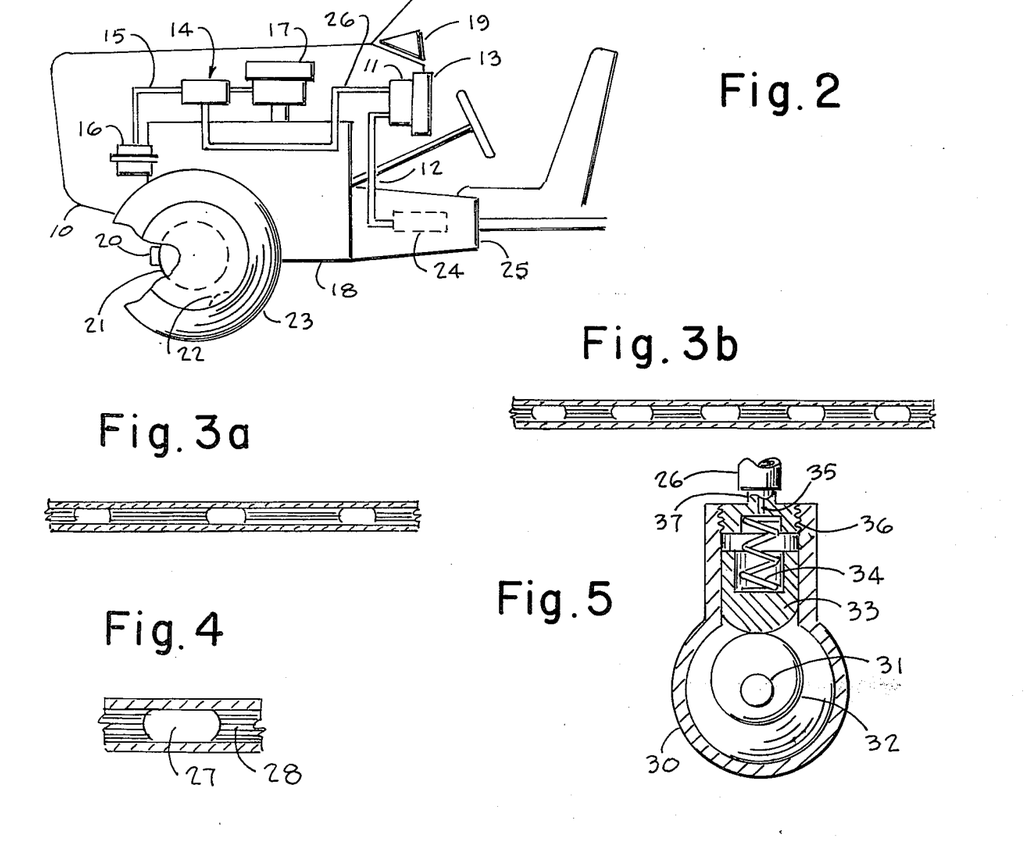
FIG. 2 is an illustration of a typical vehicle showing the relationship of an embodiment of the invention to the vehicle components.
FIG. 3a is a view of a high fuel consumption rate segmentation pattern.
FIG. 3b is a view of a low fuel consumption rate segmentation pattern.
FIG. 4 is a view of a typical instream air slug.
FIG. 5 is a sectional view of an air pulse pump.

Referring to FIG. 2 a vehicle 10 is shown whereby an air pulse pump 11, included in the means for injecting gas bubbles into the fuel line, has been installed between speedometer cable 12 and speedometer 13. The air-pulse pump 11 is connected by line 26 to an injector assembly comprising injection-detector block 14, which is coupled into fuel line 15 between fuel pump 16 and carburator 17 of engine 18. An electronic meter 19 is shown mounted on the dashboard.

An alternate position for the air pulse pump is shown: pulse pump 20 is attached to brake shoe housing 21 and is driven by actuator 22 attached to wheel rim of wheel 23. Another alternate position is shown: air pulse pump 24 coupled between speedometer cable 12 and transmission 25.

In the operation of the basic system an referring to FIGS. 1 and 2 the air pulse pump 11 provides air pulses at a rate proportional to the transversed mileage of the vehicle. An air transport tubing 26 from the pump 11 is connected to the air injection block 14 in the fuel line and permits these air pulses to be injected into the fuel stream.

When the vehicle is in motion fuel flows in the line in proportion to engine demand and the air slugs are injected at the injector block 14 into the fuel line at a rate proportional to the distance traveled by the vehicle. A segmented stream of air and fuel will be found.

A high fuel consumption segmentation is shown in FIG. 3a. A low fuel consumption segmentation is shown in FIG. 3b. FIG. 4 shows an air slug 27 and its adjacent fuel volume 28 in the injection and detector block fuel passage. In this passage, the air volume and passage diameter, as is known in the air-liquid slug flow art, is such that the injected air slug is not spherical to slightly elongated. This ensures movement of the air slug with the flow.

Thus, the mileage is directly coupled to the fuel consumption. Referring again to FIG. 2 a detector means is provided within the injector housing 14. A signal is generated by the detector and transmitted to an electronic meter 19, mounted on the dash board, and which provides a read out in miles per gallon.

It is to be noted that after detection, the segmented stream will enter the carburator 17 and the air slugs will escape from the float reservoir chamber. In float mechanism common to gasoline air carburators, the reservoir is vented to atmosphere.

The air pulse pump 11 of FIG. 2 is shown also in FIG. 5 in a general form. The air injection can be achieved by a secondary means whereby an injection pump, as part of the means for injecting gas bubbles, is located adjacent or in the injector housing 14, and is interconnected with a means for signaling the mileage information located in the positions shown for pumps 11, 20, 14. Methods for mileage signal transmission such as electronic or hydraulic can be used.

Referring to FIG. 5, within housing 30 of air pump 11, a shaft 31 is coupled to the speedometer cable at the speedometer (pump 11) or at the transmission housing (pump 24) of the vehicle. Mounted on the shaft is cam 32 actuating sealing piston 33 which is combined with return spring 34. An air outlet opening 35 is provided in end cap 36 and includes nipple 37 to retain air transport tubing 26.

Air slug injectors are well known, as is apparent from the foregoing discussion of the prior art. Such injectors can be coupled to the mileage or distance sensing means in any suitable manner and at any suitable ratio of RPM of, e.g. the speedometer cable, to slug injection.

Two embodiments of the invention by which the signal is generated will now be described.

VOLUMETRIC MEASUREMENT METHOD FOR DETERMINING FUEL CONSUMPTION

Means are provided for injecting small constant volume air slugs into the flowing fuel stream at a constant rate in terms of slugs per unit of traversed distance, such as one slug per wheel or speedometer drive cable revolution. A standard speedometer-odometer cable drive utilizes 1000 revolutions per mile.

The air slugs are observed within a fixed length of flow tube. For one particular M.P.G. there will be one and only one particular number of air pulses appearing within this fixed length of flow tube. A count of these air pulses at any one instant is a direct measurement of the instantaneous M.P.G. A continuous observation of the air slug volume, which is a measure of the air slug count, produces a signal which is amplified to drive a meter calibrated in miles per (M.P.G.).

In the operation of this volumetric measurement technique, the air pulse pump as shown in FIG. 5 need not be relied on to directly provide the air injections into the fuel, but can be used as a pneumatic mileage actuator for indirectly controlling the air injection by providing a pulse which actuates an air injector constructed and installed so that the injected bubbles are all of the same size. Also as shown in FIG. 2, air pulse pump 20 mounted on a wheel as a similar pneumatic device, may be employed to detect vehicle wheel rotation count and actuate an air injector.

Figure 6:
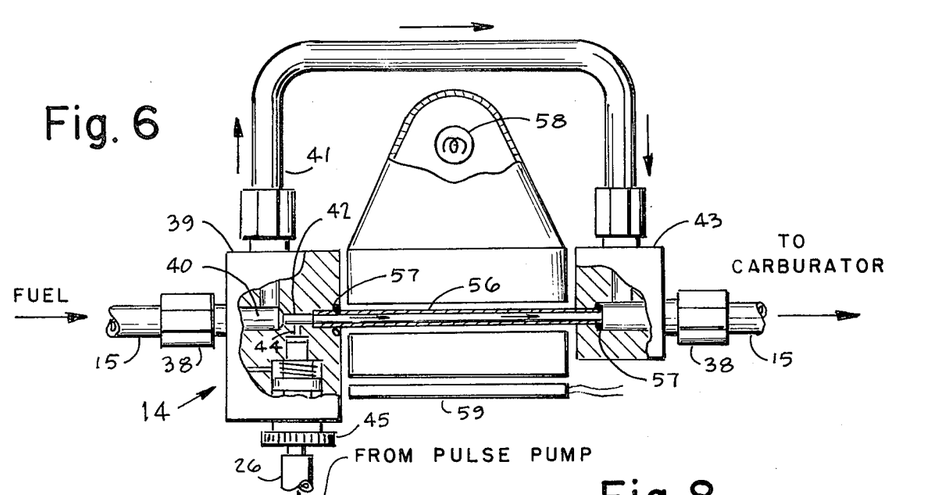
FIG. 6 is a partially sectioned view of an air injection and detector device according to a preferred embodiment of volumetric measurement.

Referring to FIG. 5, the displacement of piston 33 which is driven by cam 32 on speedometer cable coupling shaft 31, causes a pneumatic pulse to be delivered through tubing 26 which is connected to the injection-detector assembly 14 of FIG. 2. Referring to FIG. 6, the injection-detector assembly is shown connected within fuel line 15 by means of coupling members 38. An inlet block 39 is provided to allow the main fuel line passage 40 to be split into two streams, the main by-pass 41 and a small bore fuel passage 42 which recombine at exit block 43. Air injection port 44 intersects small bore flow passage 42 in block 39. On the axis of port 44 and referring to FIG. 7, a means for obtaining constant volume air slug injection is provided. The pneumatic pump pulses delivered by tubing 26 into inlet fitting 45 actuate major piston 46 causing minor piston 47 to displace a volume of air from minor chamber 48. The injection stroke of the piston member is limited by stopping the piston face 49a on block face 49b. The piston member is shown in its fully displaced or the injection position. The recovery or air loading position of the minor piston is stopped when return spring 50 causes major piston face 51a to home on fitting face 51b.

Figure 7:
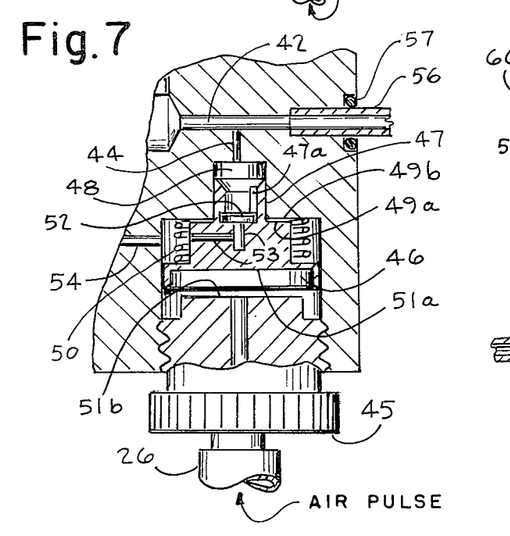
FIG. 7 is an enlarged sectioned view of a constant volume air injection means included in FIG. 6.

The flat disc valve 52 in minor piston 47 closes during the air injection stroke and opens to allow for air entry into the minor chamber 48 through slot passage 47a on the inside diameter of piston 47 and through passage 53 from vent 54, upon downward movement of the pistons 46, 47. The injected air volume can be regulated since the position of face 51b can be changed by adjustment of threaded inlet fitting 45 to vary the return stroke displacement of the piston member. The air pulse pump acting on the major piston is a closed pneumatic system. It can be replaced by a hydraulic system, or an electric system, or a mechanical system.

Referring again to FIG. 6, the small bore fuel passage 42 continues into a transparent pipe member 56 coupled between inlet block 38 and exit block 43 by means of seals 57.

The sum of the flow areas of the transparent pipe 56 and the by-pass tube 41 equal the total flow area. The volume of fuel flowing in each line 41 and 56 is proportional to its area. The proportion of the area of the by-pass 41 to the area of the transparent pipe 56 can be in the range of 10 - 1.

In the operation of the system as the vehicle is in motion, fuel flows in by-pass line 41 and in small bore passage 42, and small constant volume air slugs are injected into passage 42 forming a segmented stream flowing within transparent pipe 56. See FIGS. 3a, 3b and 4.

Let us say that we are now driving on the open highway at a moderately high steady speed, such that we are obtaining good fuel efficiency, let us say 20 M.P.G. Now, let us drive our vehicle off the highway and go into slow city street traffic. Under these conditions ore vehicle efficiency will decrease. Let us say that the actual efficiency has now dropped to 10 M.G.P. This means we are using twice as much fuel per unit distance traveled as when the vehicle was operating at 20 M.P.G. It may also be stated that we are now obtaining half the unit distance per original volume of fuel. Either way, at 10 M.P.G. we are using twice as much fuel relative to the mileage bubble input rate whereby the length of the fuel slug between mileage air pulses will be twice as long for 10 M.P.G. as it was for 20 M.P.G. It may also be stated that at 5 M.P.G. the fuel slug will be twice as long as for 10 M.P.G. and four times as long as a fuel slug at 20 M.P.G.

The viewing tube is made of a small diameter to length ratio and is used in combination with a by-pass tube 41 of a known diameter because large amounts of injected air would introduce high volume displacement errors and because the minimum M.P.G. indication is limited to an air slug pitch not exceeding half the length of the viewing tube 56 so that the number of bubbles present for fixed operating conditions will be constant. A bubble pitch greater than half but less than the length of the viewing tube 56 would contain either one or two bubbles at any given instant, and a pitch greater than the tube length would contain either none or one bubble at any given instant. It is to be also noted that the practical length of the flow tube 56 is governed by the practical length of photocell strip 59.

As an example, the results of a 0.050 in. long injected air slug at a rate of 1000 pulses per mile, in a 0.025 I.D. flow tube, 2 in. long, with a bypass I.D. of 0.267 inches can be seen in the following table.

| Miles Per Gallon | 40 | 20 | 10 | 5 | 2.5 |
|---|---|---|---|---|---|
| Fuel Slug Length | .050 | .100 | .200 | .400 | .800 |
| Pitch=(Air + Fuel Length (in.) | .100 | .150 | .250 | .450 | .850 |
| Air Slugs per 2" | 20 | 13.35 | 8 | 4.45 | 2.36 |

From this it may be stated that in a particular system of air slug milage input combined with a particular flow tube diameter and length, there is one and only one number of air slugs corresponding to each M.P.G. value. By counting the air slugs or measuring their total volume within this fixed length at any instant, an instantaneous M.P.G. evaluation is obtained.

Figure 8:
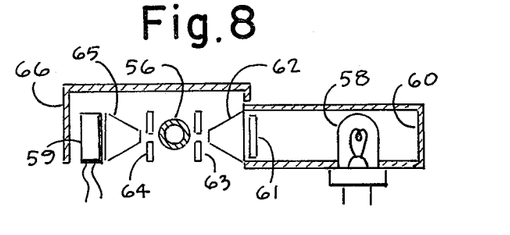
FIG. 8 is a sectioned view of the optical components of FIG. 6 taken perpendicular to the flow axis.

A bubble sensing means is provided to measure the magnitude of the air slug volume in the transparent pipe member 56. Referring to FIG. 6, a light source 58 for uniformly distributing light along the exposed length of the transparent pipe, is placed adjacent to the tube in combination with opposing photo-optical detector 59. To insure a necessary uniform light distribution along the transparent pipe for the required air slug detection, the optical components are arranged as is shown in FIG. 8 whereby the light source 58 is shown with a reflective member 60, diffuser plate 61, a light collecting prism or reflector device 62 and an aperture slit plate 63, on one side of the flow tube 56. Opposing this combination is another aperture slit plate 64, a light collector prism or reflector 65 and a response means in the form of photocell strip 59. A light sealing cover 66 is also provided. A diffuser can be interposed between the flow tube 56 and the photocell strip 59 so that the light reaching the photocell strip 59 is homogenous.

It has been shown above that the air slug density or total air volume within the length of the transparent flow pipe 56 is a direct measurement of the M.P.G. fuel consumption.

Figure 9:
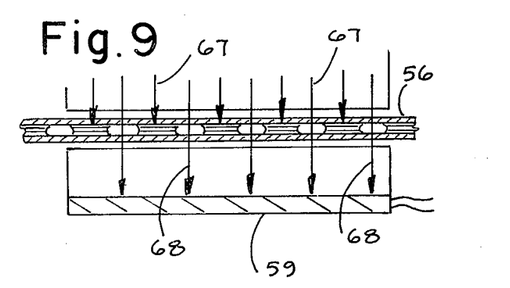
FIG. 9 is a schematic view of the light distributive effect of the segmented stream on the photo-detector of FIG. 8.
Figure 10:
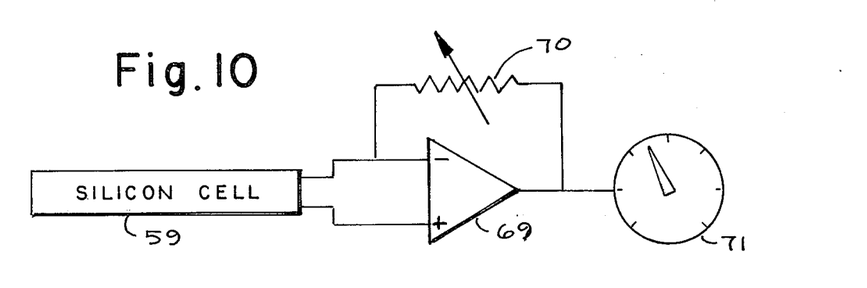
FIG. 10 is an electronic block diagram of a preferred embodiment of the volumetric measurement method of FIG. 6.

Referring to FIG. 9, light input rays 67 are indicated entering the segmented stream in the transparent pipe 56. The light rays are attenuated by the segmented stream and rays 68 strike the surface of a silicon cell detector 59. Since the current output signal of the cell 59 is proportional to the amount of light falling upon it and the light falling upon the cell is proportional to the air slug count, the magnitude of the cell current signal becomes a direct miles per gallon output. In FIG. 10 the current output signal of the silicon cell is shown entering a standard amplifier 69 which is then used to drive an indicator in the form of meter 71 graduated in miles per gallon. A calibration resistor 70 is used as a meter range expansion adjustment.

Thus, air is injected into the fuel stream governed by the motion of the vehicle, whereby a mileage to fuel relationship is established before detection and signal processing; and as a consequence of this technique a measurement method based on volumetric proportion may now be utilized so that measurement of flow rate is no longer a requirement. Also since flow rate is not now a requirement, only one detector need by employed and hence a complex timing or counter circuit is not necessary.

Although this air pulse volume method is the preferred means of determining miles per gallon from the segmented stream carrying the mileage input information, alternate methods of air slug analysis are available.

RATE METHOD FOR DETERMINATION OF FUEL CONSUMPTION

Figure 11:
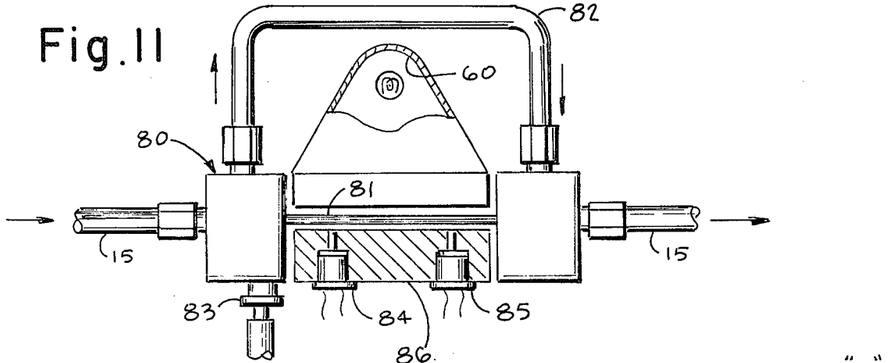
FIG. 11 shows an injection detector housing of an alternate embodiment of the invention for rate measurement.

The rate characteristics of the air slugs in the segmented stream are utilized. This alternative embodiment of the invention is shown in FIG. 11 wherein an injector assembly comprising a housing 80 is connected within fuel line 15. The housing 80 is similar to that of FIG. 6 having a transparent flow tube 81 and a bypass tube 82 with air injection fitting 83, which is part of the means for injecting gas bubbles. In this rate method the injected air slug need not be of constant volume such that a pump of the type shown in FIG. 5 may be used as a direct air injection means only to be modified to include a breather valve device as shown as item 52 in FIG. 7. Light output and transmission means are provided as in FIGS. 6 and 8. Detectors 84 and 85, which together with processing means described below with reference to FIG. 13, serve as the response means, are placed adjacent to flow tube 81 in masking block 86. As explained in the volumetric method, the I.D. of the flow tube 81 should be small compared to its length. It can be noted that the effective length of the tube is governed by the placement of detectors 84 and 85.

Figure 12:
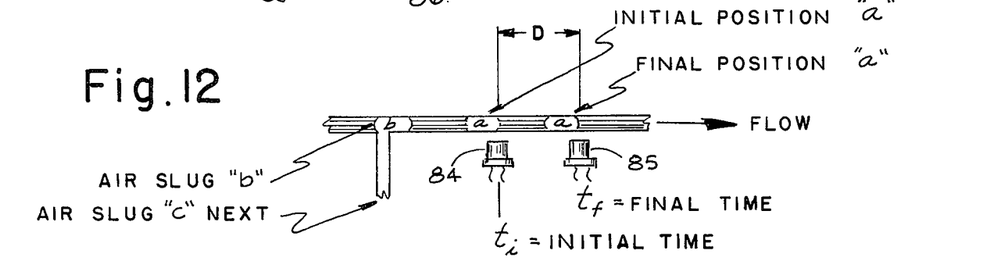
FIG. 12 is a schematic view showing the rate measurement method as utilized in FIG. 11.

In the operation of this alternate embodiment, and referring to FIG. 12, a first detector 84 is positioned after the air injection port and the second detector 85 is placed at some known distance D away from the initial detector where D, to insure proper slug detection, is longer than one air slug but is less than the minimum pitch between air slugs (e.g. at M.P.G. maximum). The presence of an air slug in the flowing stream will cause a signal response in each detector.

Referring to FIG. 12 the air slugs are shown in order $a, b, c,$—etc. The following apply:

$$\frac{\text{mi. rate}}{\text{flow rate}} = \frac{\text{mi./sec.}}{\text{gal./sec.}} = \frac{\text{Miles}}{\text{Gallon}}$$

To determine the mileage rate, one detector and two sequential air slugs are used. Using the initial detector response ($t_i$) and since the transversed vehicle mileage between air slug $a$ and air slug $b$ is a constant distance n, by the nature of the air slug injection, then the mileage rate M becomes $$M_{ab} = \frac{n}{t_{ia} - t_{ib}} = \frac{mi.}{sec.}$$

The flow rate is determined using one air slug and two detectors. Since the distance (D of FIG. 12) between the initial detector 84 and the final detector 85 is known, and the flow tube diameter is known then the volume is known and equals V. The initial detector response time is $t_i$; and the final detector response time is $t_f$; $Q_a$ is the flow rate, then $$Q_a = \frac{V}{t_{ia} - t_{fa}} = \frac{gal.}{sec.}$$

Grouping constants where $n/v = k$, fuel consumption becomes, $$\frac{mileage\ rate}{flow\ rate} = \frac{M_{ab}}{Q_a} = k \frac{t_{ia} - t_{ib}}{t_{ia} - t_{fa}} = \frac{mi.}{gal.}$$

The signal procedure continues for slugs $b$, $c$, $d$, etc. By means of known electronic counter and divider circuitry, typical of which is shown in FIG. 13, the signals processed to drive a meter or display calibrated in miles per gallon.

Figure 13:
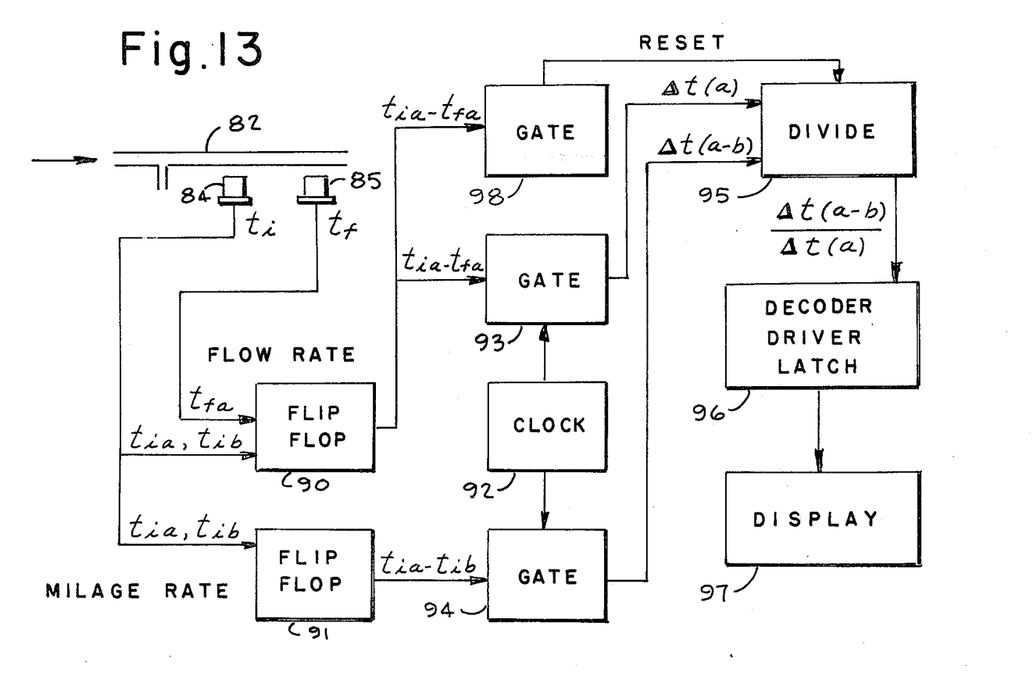
FIG. 13 is an electronic block diagram of the alternate embodiment of the invention of FIG. 11.

In operation of the response means or control circuit shown in FIG. 13 and referring also to FIG. 12, a stream of air pulses $a$, $b$, $c$ — etc., cause an initial signal response in detector 84 (e.g. $t_{ia}$, $t_{ib}$, — etc.) and a final signal response in detector 85 (e.g. $t_{fa}$, $t_{fc}$ — etc.).

At flip flop 91 a mileage rate output signal is obtained by utilizing the initial detector 84 response of one air pulse and its next subsequent pulse (e.g. $t_{ia}$ - $t_{ib}$) as an "on-off" output.

At flip flop 90 a flow rate output signal is obtained by utilizing the initial detector 84, and final detector 85 response of one air pulse (e.g. $t_{ia}$ - $t_{fa}$) as an "on-off" output.

With clock 92 pulse generator input applied to gates 93 and 94, pulse quantities are obtained proportional to mileage rate at the output of gate 94 and proportional to flow rate at the output of gate 93.

The mileage rate-flow rate time ratio is performed at divide module 95, processed and stored at decoder driver latch 96 and displayed by an indicator means or counter 97 calibrated in miles per gallon. Gate 98 resets to zero the previous determined value in the divide module 95 so that it may accept and operate on the next input.

Other bubble sensing means are possible. As previously described in the volumetric measurement method, the number of constant volume air slugs (i.e., air slugs of uniform or the same volume) within a fixed length of flow passage is a measurement of M.P.G.

Thus, the air bubble can merely be counted. Referring to FIGS. 6 and 9, the photocell strip 59 can be replaced by a plurality of small photocells, each having a length no greater than the length of one air slug with the cells spanning the length of the transparent flow tube 56. To insure discreet count of each air slug (so that one slug does not activate two detectors) the system is designed so that the fuel slug length (at maximum M.P.G.) will never be smaller than the air slug length. By means of known electronic commutative circuitry the plurality of detectors can be scanned within a small time interval whereby each scanning count is repeated to process and drive a meter or display calibrated in miles per gallon.

In another embodiment employing the volumetric measurement, the air to fuel volume proportion can be measured by buoyancy. A horizontally disposed, thin wall rigid tube having a high length to diameter ratio (e.g. about 100-1) containing the segmented stream can be immersed within a liquid. For example, the tube can be disposed in a horizontally disposed, closed cylinder containing water with the inlet and outlet means of the tube affixed to the ends of the cylinders. As the segmented stream flows through the tube, bending of the tube will be caused by the buoyant force of the air in the stream and the amount of deflection will be proportional to the air slug density. By means of known instrumentation of the strain gauge type or other deflection measuring means this deflection can be monitored and the resulting signal can be processed by known electronic means to drive a meter or display calibrated in miles per gallon.

Indeed, utilizing the volumetric measurement, some measure of miles per gallon could be obtained by visually observing the number of air slugs in a length of transparent tubing.

In the application of the invention for use in a diesel engines, combustion efficiency will not be effected when the small air volumes are introduced into the fuel supply at the low pressure side of the fuel injection system. The air can then be vented in a separator before pressurizing of the fuel. Because of the higher viscosity of diesel fuel as compared to gasoline, a greater diameter to length ratio of the viewing tube, 56 of FIG. 6, is required. For a practical I.D. size, the photocell strip 59 will also be proportionally longer.

In all the aforementioned embodiments the use of injected air bubbles into the fuel stream has been shown as a means for combining machine output with fuel consumption since air is a most convenient medium by which the machine output may be combined with the fuel volume. The combination of machine output and fuel information is by no means limited to the injection of air as the machine output indication means. Other means may also be used.

As previously described in the air injection method and as shown in FIG. 6; by means of port 44, small volumes of high opacity organic dye substance can be injected into flow passage 42. Employing the same light source 58 and detector 59, the resultant integrated opacity signal across the transparent pipe 56 becomes a function of machine output versus fuel consumption. The well known fuel compatable dyes, combustable in nature, and in very small amounts, will not adversely affect performance.

Opaque small diameter balls, semi-solids such as mercury or insoluble fluids could also be used but it becomes apparent that since these substances must be removed from the fuel line and recirculated before the fuel enters the carburator, other mediums which are compatible with the fuel system are best chosen.

Energy forms other than visible light can be used to combine machine output with fuel consumption directly within the fuel stream. Heat may be employed as the milage input media.

It is to be first noted that heat transfer techniques are presently employed in the measurement of liquid and gas flow rates. The basic method utilizes a direct relationship between flow velocity and a known rate of heat transfer of a temperature sensing detector whereby applying a steady source of heat to a temperature sensing termistor in a flow path, the measurable rate of heat transfer is directly related to the flow rate.

Another flow rate measurement method utilizes heat transfer techniques in combination with the fluidic principle of "vortex shedding". One such method is described in Rodely U.S. Pat. No. 3,572,117, whereby an instream obstruction generates vortex flow pulses at a frequency which is directly proportional to the flow rate and the sensing of these fluid pulses is achieved by the variance in heat transfer to a self heated temperature sensor placed in the path of these vortex pulses. These heat transfer methods are applied to the measurement of flow rates only.

Herein disclosed is a device by which a heat transfer method is used to determine machine output relative to fuel consumption, employing a machine output-heat analog equivalent to the machine output-light analog previously described in the air slug volumetric measurement method. Heat pulses are introduced into the fuel stream in dependence upon machine output such that the heat pulse density or total heat measurement within a know volume length of fuel becomes a direct measure of the machine output vs. fuel consumption. A means is described by which this heat pulse density measurement is made and displayed by a meter as in an automobile in miles per gallon.

Figure 14:
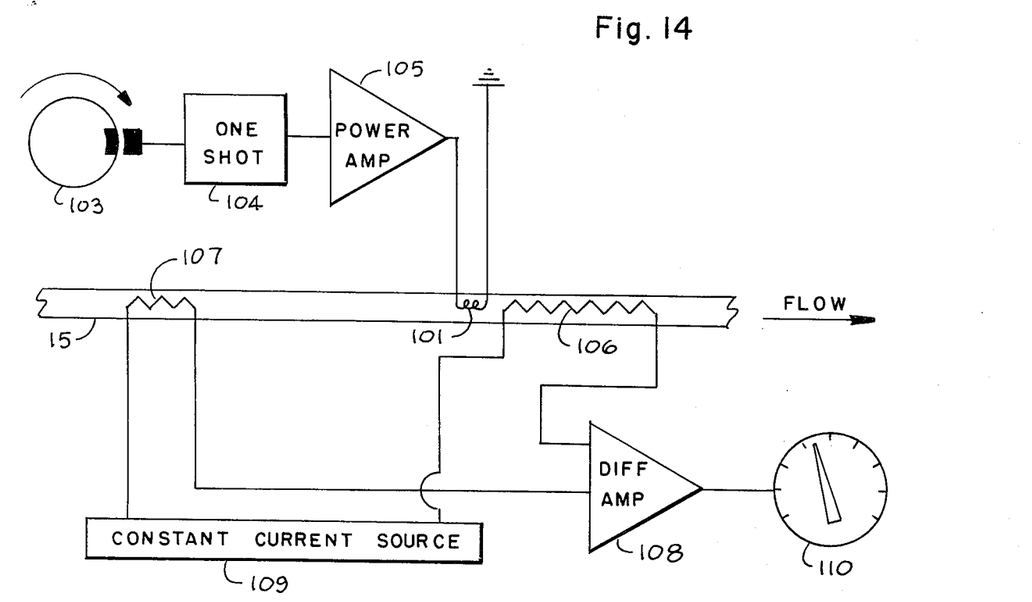
FIG. 14 is a schematic of an embodiment wherein heat, instead of air is injected into the fuel.

Referring to FIG. 14, an electrical heat output source 101 is placed within the fuel stream of fuel supply 15. Signal pulses, caused by a pulse generator 103 of known type driven by the machine output such as a coupling as is used to couple traversed milage and air pulses in FIGS. 1–13 are made to be of constant magniture by "one shot" 104, and are amplified by power amplifier 105 to cause constant quantum heat pulses to be introduced by the heater 101 at a rate proportional to transversed milage into the flow stream.

Immediately downstream from the heat pulse source 101, a thermistor heat detector 106 of known length is placed within the flow stream such that at any one instant said thermistor resistance is a function of the sum of heat pulses intercepted by the total length of detector 106 within its corresponding constant volume of fuel adjacent to the detector.

To identify only the milage-heat output signal, a thermistor heat detector 107 is placed upstream from the heat source 101 whereby its resistance value is a measure of the initial flow stream temperature. By means of difference amplifier 108, the net resistive difference between detectors 106 and 107 is made to modulate the circuit of constant current source 109 to drive a meter 110 calibrated in miles per gallon. The signal subtraction also compensates for ambient temperature variations.

In actual operation of this heat transfer method inertia and thermal response conditions must be considered, and although the ideal state of the quantum heat pulse transfer can never be reached because flow is present, yet metering can be obtained by efficient design of the heat transfer mechanism.

The magnitude of each quantum heat pulse is made of low energy value such that at high fuel flow rates it is almost totally transferred to the flow stream. The heater 101 is to be of small thermal mass to improve response and reduce the heat transfer variation due to changing flow rate. The detector 106 is also to have a small thermal mass to improve its response and to be of considerable length within that known length of fuel volume, to increase the surface area of the heat transfer mechanism to improve the detector sensitivity.

SUMMARY OF THE INVENTION

Thus, the invention provides a meter for a machine employing a fluid fuel and having a fuel line interconnecting a fuel supply station with the machine, and which receives fuel from the fuel supply in proportion to machine demand for fuel. The meter indicates output of the machine in relation to fuel consumption. The device of the invention comprises an injection assembly for insertion into the fuel line having a pipeway passage therein for travel of the fuel therethrough. Means are provided for injecting an input signal into the fuel passing through the pipeway passage, which is a measure of machine output, for travel of the input signal with the fuel through said pipeway passage. Further, sensing an output signal means are provided, for sensing the injected input signal in a part of the pipeway passage, and producing an output signal which is a measure of the machine output in relation to fuel consumption. Thus, the machine output is integrated with fuel volume. Finally, the device comprises an indicator operatively connected to the sensing and output signal means for receiving said output signal and indicating the machine output in relation to fuel consumption.

In a preferred embodiment, the invention provides a meter for a machine, which can be an internal combustion engine, and which employs a liquid fuel and has a fuel line interconnecting a fuel supply station with the machine, and which receives fuel from the fuel supply in proportion to machine demand for fuel, for indicating output of the machine in relation to fuel consumption. The meter comprises an injection assembly (FIG. 2, 14) for insertion in the fuel line and having a first pipeway passage (e.g. FIG. 6, 56) therein for travel of fuel therethrough, and a second pipeway passage (e.g. FIG. 6, FIG. 7, 44) therein for introduction of gas into the first pipeway passage for formation of bubbles in the first pipeway passage for slug flow of the fuel through said first pipeway passage. Means are provided for injecting gas into the second pipeway passage in dependence on machine output (e.g. where the machine is a wheeled vehicle, distance traversed by the machine) for said formation of gas bubbles in the first pipeway passage. A response means or primary response means comprising bubble sensing and signal output means is provided for sensing bubbles in a length of the first pipeway passage of the injector assembly and producing an output signal which is a measure of the machine output in relation to fuel consumption. For example, with reference to FIGS. 6, 8, 9 and 10, the bubble sensing and signal output means comprises the light source 56, silicon cell 59, and amplifier 69 (FIG. 10), which cooperate to produce the output signal transmitted to the indicator 71 (FIG. 10), which is an indicator operatively connected to the bubble sensing and output means for receiving the output signal and indicating the machine output in relation to fuel consumption. As explained in detail above, the outut of the machine in relation to fuel consumption indicated, can be miles per gallon.

Further concerning the bubble sensing and signal output means, that means can comprise means for directing radiation through said length of the first pipeway passage for variation of radiation transmitted through said length in dependence on the presence of bubbles in said length. The length of the passageway is at least partially transparent to the radiation for permitting said transmittance. The radiation can be any suitable electromagnetic radiation, and is preferably in the visible light portion of the spectrum. Further included is detector means for receiving transmitted radiation and issuing an output in dependence on radiation transmittance for the signal output.

For example, with reference to FIGS. 6, 8, 9 and 10, the light source 58, reflector 60, etc. direct radiation through the first pipeway passage. The amount of radiation transmitted through the first pipeway passage varies in dependence on the volume of bubbles in the pipeway passage. Referring to FIG. 10, a detector, namely silicon cell 59, and amplifier 69 receive the transmitted radiation and issue an output in dependence on the amount of transmitted radiation for the signal output transmitted from the amplifier 69 to the indicator 71.

Where this volumetric measurement technique is employed, i.e., where variation in the volume of bubbles in the first pipeway passage is sensed, the injection means is preferably such that gas quanta are introduced into the first pipeway passage so that the bubbles formed therein are of the same size. Thus, the injecting means can comprise a machine output actuated device (e.g. FIG. 5, pump 11) which produces an input signal which is a measure of machine output. The air injector device (e.g. FIG. 7) is operatively connected to the input signal device for operation of the air injector in dependence on input signals produced by the input signal device. In the embodiment of FIGS. 5 and 7, the pump 11 transmits air pulses as the input signals, to the injector shown in FIG. 7.

In the embodiment of FIGS. 11, 12, and 13, in the bubble sensing and signal output device, the detector means comprises two detector devices 84, 85, which are disposed at spaced intervals along the first pipeway passage for receiving transmitted radiation and issuing input signals in dependence on radiation transmittance. A response or auxiliary response means is operatively connected to the two detectors for receiving the input signals thereof and issuing an output signal in dependence thereon, for the signal input. The response means comprises the circuitry shown in FIG. 13, connected to the detector devices 84, 85, including the decoder drive latch 96 which issues the output signal.

Embodiments of the invention employing mediums other than air have been described and it is therefore to be recognized that in all cases these additions to the fuel supply affect a change in the apparent density or state of the fuel in proportion to machine output for the metering purpose while not adversely affecting the nature of the fuel or machine performance.

Whereas certain embodiments of the invention have been shown, it is to be understood that the invention is not limited thereto.

What is claimed is:

1. A meter for a machine employing a liquid fuel and having a fuel line interconnecting a fuel supply station with the machine, and receiving fuel from the fuel supply in proportion to machine demand for fuel, for indicating output of the machine in relation to fuel consumption, comprising:
   a. an injection assembly for insertion in the fuel line having a first pipeway passage therein for travel of fuel therethrough, a second pipeway passage therein for introduction of gas into the first pipeway passage for formation of bubbles in the first pipeway passage for slug flow of the fuel through said first pipeway passage,
   b. means for injecting gas into the second pipeway passage of the injection assembly in dependence on machine output for said introduction of gas bubbles into the first pipeway passage,
   c. bubble sensing and signal output means for sensing bubbles in a length of the first pipeway passage of the injection assembly and producing an output signal which is a measure of the machine output in relation to fuel consumption,
   d. an indicator operatively connected to the bubble sensing and signal output means for receiving said output signal and indicating the machine output in relation to fuel consumption.

2. A meter according to claim 1, said machine being a vehicle, the gas injecting means being for injecting gas into the first pipeway passage in dependence on distance traversed by the vehicle.

3. A meter according to claim 2, wherein the bubble sensing and signal output means comprises means for directing radiation through said length of the first pipeway passage for variation of radiation transmitted through said length in dependence on the presence of bubbles in said length, said length being at least partially transparent to the radiation for permitting said transmittance, and detector means for receiving transmitted radiation and issuing an output in dependence on radiation transmittance for the signal output.

4. A meter according to claim 3, wherein said detector means comprises two detection devices disposed at a spaced interval along said length of the first pipeway passage, for receiving transmitted radiation and issuing input signals in dependence on radiation transmittance, a response means operatively connected to the two detectors for receiving the input signals thereof and issuing an output in dependence thereon for the signal output.

5. A meter according to claim 2, wherein the bubble sensing and signal output means comprises means for directing radiation through said length of the first pipeway passage for variation of radiation transmitted through said length in dependence on the volume of bubbles in said length, said length being transparent to the radiation for permitting said transmittance, and a detector for receiving the transmitted radiation and issuing an output in dependence on the amount of transmitted radiation for the signal output.

6. A meter according to claim 5, said injecting means comprising a machine output actuated device for producing an input signal which is a measure of machine output, an air injector device for injecting gas quanta into the first pipeway passage so that the bubbles formed therein are of the same size, operatively connected to the input signal device for operation of the air injector in independence on input signals produced by the input signal device.

7. A meter according to claim 2, the output of the machine in relation to fuel consumption indicated, being miles per gallon.

8. A meter according to claim 2, said injector assembly comprising a by-pass line for by-passing a portion of the fuel conveyed by the fuel line, around the first pipeway passage.

9. Apparatus comprising a machine employing a liquid fuel, a fuel supply station, and a fuel supply line interconnecting the fuel supply station and the machine, and a meter according to claim 6 mounted in the fuel supply line.

10. Method for measuring output in relation to fuel consumption of a machine employing a liquid fuel and having a fuel line interconnecting a fuel supply station with the machine, and receiving fuel from the fuel supply in proportion to machine demand for fuel, comprising:

a. injecting a gas into the fuel line for producing bubbles of the same size in a length of the fuel line for slug flow of the fuel through said length, in dependence on machine output, b. measuring the volume of bubbles in said length as measure of said output in relation to fuel consumption.

11. Process according to claim 10, wherein said machine is a vehicle and the input signal is injected in dependence on distance traveled by the vehicle, and said measuring is in miles per gallon of fuel.

* * * * *